Aug. 29, 1939.  J. ERBEL  2,171,473
BRAKING MECHANISM
Filed Sept. 17, 1937  2 Sheets-Sheet 1
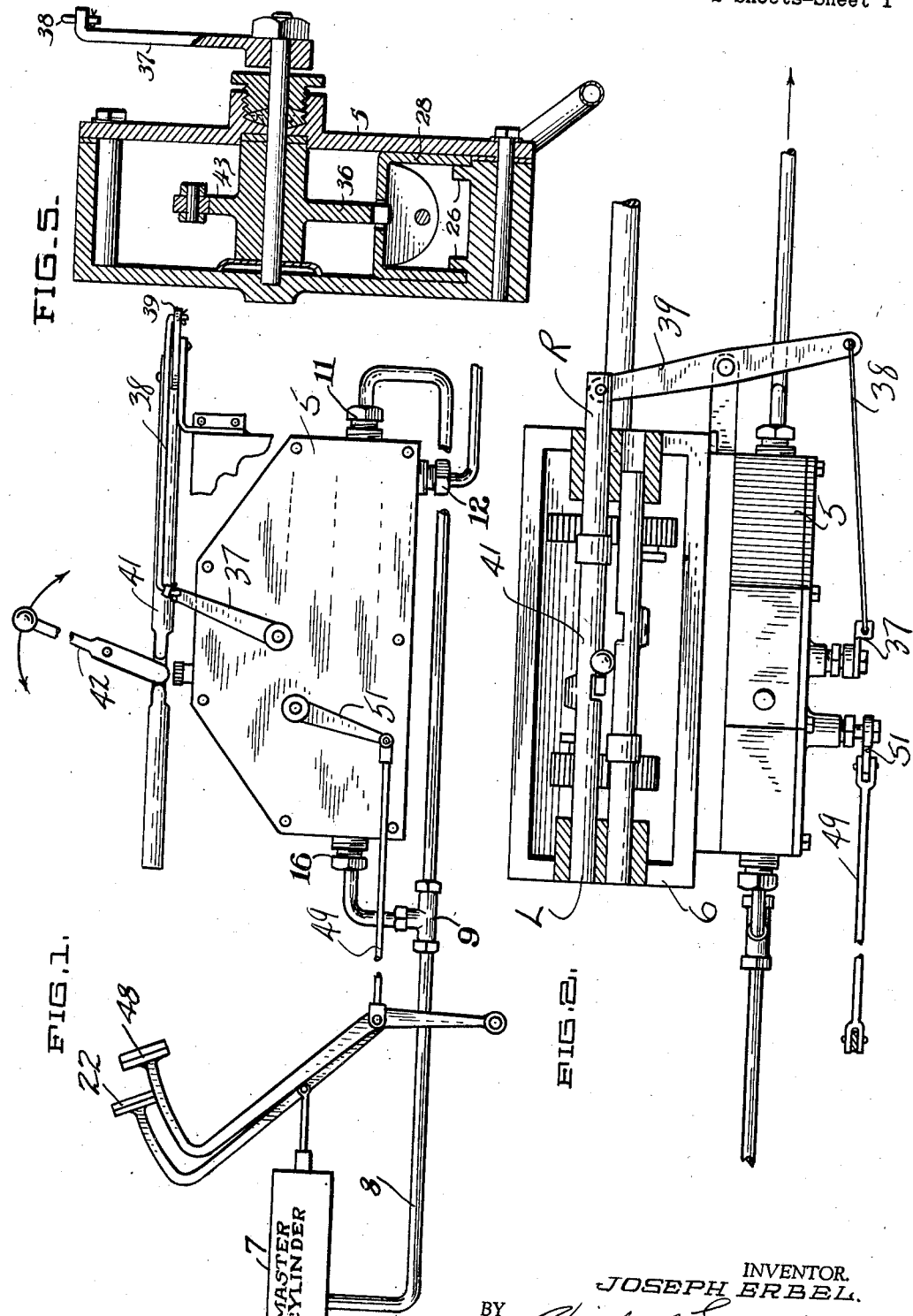
INVENTOR.
JOSEPH ERBEL.
BY
ATTORNEYS.

Aug. 29, 1939.                J. ERBEL                 2,171,473
                          BRAKING MECHANISM
                       Filed Sept. 17, 1937         2 Sheets-Sheet 2
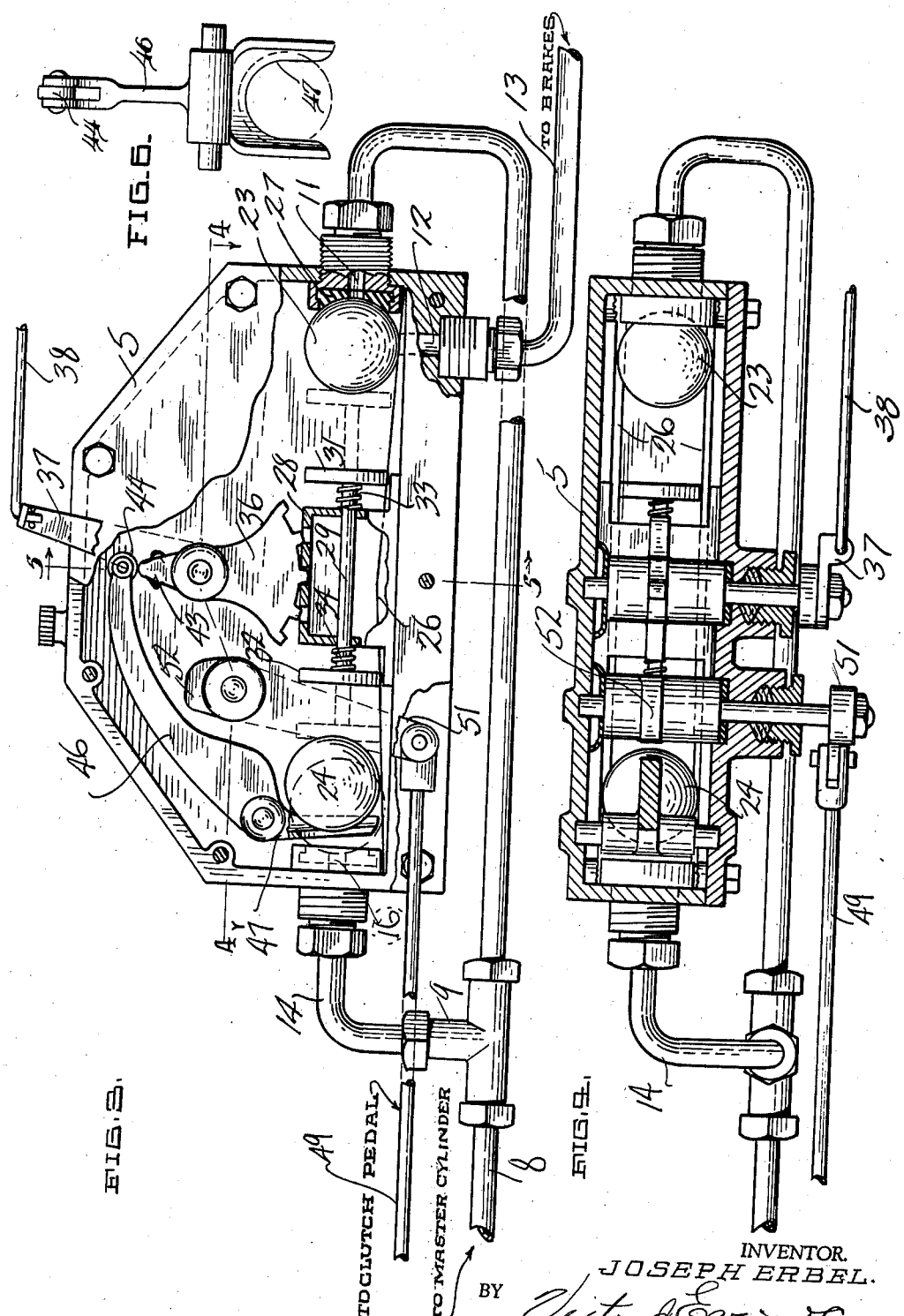
INVENTOR.
JOSEPH ERBEL.
BY
Victor J. Evans & Co
ATTORNEYS.

Patented Aug. 29, 1939

2,171,473

UNITED STATES PATENT OFFICE 2,171,473

BRAKING MECHANISM

Joseph Erbel, San Francisco, Calif.

Application August 17, 1937, Serial No. 159,575

3 Claims. (Cl. 192—4)

This invention relates to improvements in braking mechanism and has particular reference to a device for preventing vehicles from moving down hill either forwardly or rearwardly, without manually holding the brakes in applied position, and especially to facilitate starting the vehicle up a hill, after coming to a full stop.

A further object is to produce a device of this character which may be readily installed in the modern motor vehicle without materially altering its construction.

A still further object of the invention is to produce a device of this character which may be economically manufactured.

Other objects and advantages will be apparent during the course of the following description.

In the accompanying drawings forming a part of this specification and in which like numerals are employed to designate like parts throughout the same, Fig. 1 is a side elevation of my device, showing the schematic arrangement of the shift lever and its component operating parts;

Fig. 2 is a top plan view of Fig. 1;

Fig. 3 is an enlarged side elevation, showing a portion thereof broken away and further illustrating the operation of the device;

Fig. 4 is a plan cross section taken on the line 4—4 of Fig. 3;

Fig. 5 is a cross sectional view taken on the line 5—5 of Fig. 3; and

Fig. 6 is a front view of the releasing fork.

When a motor vehicle not equipped with my device is stopped upon a hill, whether it is facing down or up the hill, the operator must either apply the emergency brake lever or retain the brakes applied by the foot pedal, but such is unnecessary when my device is installed on the vehicle, as will be later apparent. It is also exceedingly difficult to proceed up the hill, after stopping, due to the necessity of holding the brakes with the foot pedal and then releasing the same at the correct moment, as the brake and clutch pedals as well as the accelerator pedal must be operated substantially simultaneously.

In order to overcome the above difficulty I have devised a simple mechanism to be connected into the hydraulic brake line, and referring to the drawings in detail, it will be noted that the mechanism consists of a casing 5 to be filled with fluid and positioned adjacent to the transmission or change speed gearing housing 6 of the vehicle.

The master cylinder of the hydraulic brake system is indicated by the reference numeral 7, and from which a pipe 8 extends and is connected to the T-coupling 9 which is also connected to the port 11 at one end of the casing 5 as clearly shown in Fig. 3. A port 12 of the casing is connected through the medium of a pipe 13, to the brake cylinders of the system, and a pipe 14 is connected to the T-coupling and to the port 16 at the opposite end of the casing. Suitable packing glands are provided for the respective ports, to prevent leakage, as will be apparent. The brake pedal 22 is connected to the piston rod of the master cylinder in the usual manner, as shown in Fig. 1.

Within the casing 5 are positioned balls 23 and 24 which rest upon the inclined rails 26 so as to normally roll toward rubber seats 27 adjacent each of the ports 11 and 16 to control the same. A slider 28 carries a rod 29, having heads 31 and 32 which are spaced from the slider by springs 33 and 34 and the heads are engageable with the balls to hold the same seated. A quadrant 36 has its teeth engaging the slider 28 and is moved through the medium of a lever 37 connected by the rod 38 to the walking beam 39, which is pivoted to the low and reversing gear slider 41, that is actuated by the customary gear shift lever 42. The quadrant 36 has a nose 43 which is adapted to engage a roller 44, carried upon a pivoted arm 46, which has a release fork 47 formed upon its lower extremity, for moving and holding the ball 24 from its seat, as clearly shown in Fig. 3. The clutch pedal 48 is connected by a rod 49 to a lever 51, which lever is pivoted within the casing and carries a cam 52, the purpose of which will be later seen.

With respect to the operation, and assuming that the vehicle is standing on level surface, so that the ball 24 has moved toward the port 16, and rests against the fork 47, while the ball 23 has moved against the port 11, the device being then in normal position, and will not operate as long as the gear shift lever is left in neutral position, as the quadrant 36, with its integrally formed nose 43 will not permit the arm 46 to drop, when resting through the medium of the roller 44, on the nose 43, as shown in Fig. 3. By applying the clutch pedal, the cam 52 will take the position as shown in Fig. 3, and upon shifting the lever 42, for placing the gearing into low forward speed, the quadrant 36 will move the slider 28 toward the left of Fig. 3. At the same time, the nose 43 of the quadrant 36 will move to the right, permitting the arm 46 to drop and allowing the ball 24 to be pressed by the slider 28 and its spring against the port 16. By shifting to neutral again, the quadrant nose will raise the arm 46, thus prying off the ball 24 from its seat while the slider has moved to the center. By shifting into reverse gear, the quadrant's nose will allow the arm to drop, moving the slider 28 to the right and pressing the ball 23 against the port 11. Under both actions, when the brake pedal has been applied liquid will be forced from the master cylinder through the device, the liquid escaping through the port 12 and setting the brakes. The driver may then remove the foot from the brake pedal as the brakes are held set. Upon releasing the clutch pedal, the cam 52 will move the arm 46, prying off the ball 24 and thus releasing the trapped liquid, allowing the same to pass through the port 16, to the T-coupling 9 and pipe 8 back to the master cylinder. When the driver has started the vehicle forward, in low gear and the vehicle is moving, he usually will shift from low gear into second gear, thus leaving the quadrant 36 in the center with the nose raising the arm 46, through which action the ball 24 is kept in an unseated position. Thus the driver will have full control over his brakes. He may shift to high gear, whereby the quadrant also remains in the same position, and, as is obvious, the driver has full control in second and high gear.

From the foregoing, it will be obvious that the driver may remove the foot from the brake pedal and feel assured that the brakes will hold until the clutch pedal is released, therefore it will be seen that it is not necessary, in order to proceed up a grade, when the vehicle has come to a full stop, to hold in both the clutch pedal and the brake pedal, it merely being necessary to hold in the clutch pedal after the brake has been once applied. Therefore, the foot ordinarily used for applying the brakes may be used for the accelerator pedal, and when the driver wishes to move the vehicle, it is then only necessary to release the clutch pedal and apply the accelerator pedal.

It might be further mentioned that when the vehicle is travelling on level and slight inclined roads in low forward gear, deceleration of the vehicle will cause the ball 23 to roll forward from its port 11 while the ball 24 is pressed against the port 16. Even under this condition the driver has almost full control with a disengaged clutch over his brakes, until he comes to a complete stop.

On steeper hills, going forward, more power is used to propell the vehicle and deceleration of the motor vehicle will never be present so the brakes are set as soon as the driver applies the brake and disengage the clutch. The driver may release his brake without disengaging the clutch by merely shifting into reverse, through which action the slider 29 has moved to the right (see Fig. 3) while at the same time, the nose of the quadrant has pried off the ball 24 from its seat, which has also rolled to the right, thus causing a free flow of the liquid to the master cylinder. The brakes are never set or locked as long as he is driving in reverse gear down a hill. If he continues to drive in reverse gear, to the bottom of the hill and meets an upgrade, continuing in the reverse gear, the ball 24 will roll against the port 16, and will completely close the port 16 as soon as the clutch is disengaged. If the brake pedal is then applied, the brakes will remain set. The driver may, however, continue to back up, merely by releasing his clutch pedal, whereas the brake is released as soon as the clutch pedal is engaged. The engaging of the clutch pedal will pry the ball 24 off its seat, port 16. If the driver wishes to go forward, he may do so without releasing the clutch, provided his brakes are set and the clutch is disengaged. He merely shifts into forward gear, through which action the nose of the quadrant will pry the ball 24 off its seat, and the ball 23, when the liquid pressure is released, will again roll forward to the left. In most instances, the return of the liquid through the pipe 13 from the brake cylinders will assist in moving the ball 23 from its seat, port 11.

It will be obvious that subject to minor changes, the device may also be used on vehicles that employ an automatic gear shift.

In my previous Patent No. 1,891,875, that issued under date of December 20, 1932, I disclosed a brake mechanism that could be employed with any motor vehicle using a brake pedal and clutch pedal. In that invention I produced a separate device which forced liquid from one cylinder into another through the movement of the brake pedal, the liquid being trapped and released by the clutch pedal valve. This action caused the brakes to be held either set or released.

My later invention, as disclosed in the present case, is adapted to be used in a braking system which is employing cylinders and pistons to set the brakes directly, the liquid being forced from one larger cylinder into the customary four smaller cylinders, which expand the brake shoes in the present four wheel brakes (a similar action as my previous patent.)

My new invention differs from my previous patent in that it is assisted by the gear shift in controlling the flow of liquid, either in driving forwardly or backwardly.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim—

1. In a device of the character described, a hollow casing connected to the fluid system of a hydraulic brake, valves mounted in said casing, said valves being so arranged as to prevent release of the brakes of the motor vehicle after the pressure has been applied, and means for releasing one of said valves, said means including a fork lever engaging said valve and a cam engaging said fork lever when the clutch of the vehicle is released.

2. In a device of the character described, a hollow casing connected to the fluid system of a hydraulic brake, valves mounted in said casing, said valves being so arranged as to prevent release of the brakes of the motor vehicle after the pressure has been applied, means for releasing one of said valves, said means including a fork lever engaging said valve and a cam engaging said fork lever when the clutch of the vehicle is released, and a pivotally supported nose engaging said lever, said nose being moved through the gear shifting arrangement of the vehicle.

3. In a device of the class described, embodying a hollow casing connected to the fluid system of hydraulic brakes, of a motor vehicle, valves mounted in said casing, said valves being so arranged as to prevent release of the brakes of said motor vehicle after the pressure has been applied, manually controlled means for releasing one of said valves, said means including a forked lever capable of engaging said valve and a cam capable of engaging said forked lever when the clutch of the vehicle is released, and a pivotally supported nose adapted to engage said lever, and capable of being moved into operative position through the gear shifting device of the vehicle.

JOSEPH ERBEL.